United States Patent
Holmstadt (10) Patent No.: US 8,890,678 B2
(45) Date of Patent: Nov. 18, 2014

(54) PLUG-AND-PLAY SENSOR PERIPHERAL COMPONENT FOR PROCESS INSTRUMENTATION

(75) Inventor: Clarence Edward Holmstadt, Chaska, MN (US)

(73) Assignee: Rosemount Inc., Chanhassen, MN (US)

( * ) Notice: Subject to any disclaimer, the term of this patent is extended or adjusted under 35 U.S.C. 154(b) by 504 days.

(21) Appl. No.: 13/353,410

(22) Filed: Jan. 19, 2012

(65) Prior Publication Data

US 2013/0191556 A1   Jul. 25, 2013

(51) Int. Cl.
*G08B 1/08* (2006.01)

(52) U.S. Cl.
USPC ...... 340/531; 340/501; 340/514; 340/539.26; 340/595; 73/861.12; 73/861.15; 73/866.5; 73/204.11

(58) Field of Classification Search
USPC ............... 340/501, 531, 514, 539.26, 595, 340/870.31; 73/861.12, 861.15, 866.5, 73/204.11, 204.12, 204.13, 597, 602; 702/45, 85, 98–100, 127, 130, 188; 374/142, 148, 165, 178, 179, 183, 190, 374/194, 201, 208
See application file for complete search history.

(56) References Cited

U.S. PATENT DOCUMENTS

| | | | |
|---|---|---|---|
| 5,451,939 A * | 9/1995 | Price | 340/870.31 |
| 5,650,778 A * | 7/1997 | Urbas et al. | 340/870.31 |
| 5,764,928 A | 6/1998 | Lanctot | |
| 6,485,175 B1 | 11/2002 | Nimberger et al. | |
| 6,799,195 B1 | 9/2004 | Thibault et al. | |
| 7,020,532 B2 | 3/2006 | Johnson et al. | |
| 7,165,883 B2 * | 1/2007 | Nimberger et al. | 374/148 |
| 7,258,021 B2 | 8/2007 | Broden | |
| 7,366,624 B2 | 4/2008 | Wobschall | |
| 7,373,356 B2 | 5/2008 | Potter et al. | |
| 7,496,473 B2 | 2/2009 | Lenz et al. | |
| 7,986,218 B2 * | 7/2011 | Watters et al. | 340/10.41 |
| 2003/0069713 A1 | 4/2003 | Friedl et al. | |
| 2006/0254911 A1 * | 11/2006 | Lindmueller et al. | 204/424 |
| 2007/0085670 A1 | 4/2007 | Peluso | |
| 2007/0229229 A1 * | 10/2007 | Nelson et al. | 340/10.41 |
| 2010/0302008 A1 * | 12/2010 | Engelstad et al. | 340/10.1 |

(Continued)

FOREIGN PATENT DOCUMENTS

| | | |
|---|---|---|
| DE | 102006005632 A1 | 8/2007 |
| DE | 102007102992 B3 | 8/2008 |
| EP | 1302755 A1 | 4/2008 |

OTHER PUBLICATIONS

International Search Report and Written Opinion of the International Search Authority in application No. PCT/US2012/071637 dated Apr. 22, 2013.

*Primary Examiner* — Brian Zimmerman
*Assistant Examiner* — An T Nguyen
(74) *Attorney, Agent, or Firm* — Kinney & Lange, P.A.

(57) ABSTRACT

A plug-and-play sensor peripheral component includes an electrically conductive physical connector; an electrical connector; a transformer; and an RF communication and data storage circuit. The electrical connector is electrically connected to the physical connector by a first conductive path. The transformer is electrically connected to the RF communication and data storage circuit. The transformer and the RF communication and data storage circuit are electrically isolated from the physical connector and the electrical connector. Electrically connecting the physical connector to the electrical connector by other than the first conductive path inductively couples the RF communication and data storage circuit to the first conductive path.

16 Claims, 6 Drawing Sheets

(56) References Cited

U.S. PATENT DOCUMENTS

| | | | |
|---|---|---|---|
| 2010/0320755 A1* | 12/2010 | Williams et al. | 285/355 |
| 2011/0054822 A1 | 3/2011 | Bauschke et al. | |
| 2011/0209542 A1* | 9/2011 | Hucker et al. | 73/273 |
| 2013/0191556 A1* | 7/2013 | Holmstadt | 710/16 |

* cited by examiner

PLUG-AND-PLAY SENSOR PERIPHERAL COMPONENT FOR PROCESS INSTRUMENTATION

BACKGROUND

The present invention relates to industrial process transmitters and sensors. In particular, the invention relates to the configuration of a process transmitter with information specific to an attached sensor peripheral component.

Industrial process transmitters and sensors are used to sense various characteristics of fluids flowing through a conduit or contained within a vessel and transmit information about those process characteristics to a control, monitoring and/or safety system remotely located from the process measurement location. A sensor assembly generally includes a sensor, sensor wires, isolating materials and installation fittings. The sensor assembly senses a process parameter, for example, pressure, temperature, pH or flow rate. A process transmitter electrically connected to the sensor assembly by the sensor wires receives a sensor output signal from the sensor assembly. The transmitter reads the sensor output signal received from the sensor assembly and converts it to information accurately representing the process parameter. Finally, the transmitter sends the information to the control system.

In many applications, the sensor assembly attaches to a peripheral component to protect the sensor assembly or enhance its performance. For example, a temperature sensor assembly may attach to a thermowell. The thermowell is designed to be in physical contact with the fluid to protect a temperature sensor within the temperature sensor assembly from physical damage from the fluid, e.g., impacts, corrosion, etc., while efficiently conducting heat between the fluid and the temperature sensor. A thermowell must be compatible with an attached temperature sensor assembly to provide adequate protection while efficiently conducting heat between the fluid and the temperature sensor. Attaching a temperature sensor assembly to the wrong size or style of thermowell may result in damage to the sensor assembly or poor performance in measuring fluid temperature. In addition, a thermowell may be degraded over time as the surface of the thermowell is worn away by the physical and/or chemical action of the fluid which may result in compromised protection for the temperature sensor assembly. A thermowell may also suffer from the accumulation of material from the fluid on the surface of the thermowell (fouling) resulting in poor temperature measurement performance due to the insulating effects of the accumulated material.

Thus, sensor peripheral components, although generally much simpler than, for example, an attached sensor assembly, have important characteristic information specific to a particular sensor peripheral component. In the case of a thermowell, important characteristic information includes, for example, thermowell type, typically located on a metal tag attached to the thermowell; fouling diagnostics information and wake frequency calculation parameters manually entered into an attached process transmitter; and maintenance schedules for inspection and replacement recorded in a remote database. Metal tags can be lost or obscured. Manually entering information into the process transmitter is a time-consuming process requiring the attachment of a separate electrical connection and, as with any manual process, is prone to error. Remote maintenance schedules may not be readily accessible in the field and may not reflect actual usage information. Process measurement accuracy and reliability depend, in part, on the availability of the characteristic information for an attached sensor peripheral component.

SUMMARY

In one embodiment of the present invention, a plug-and-play sensor peripheral component includes an electrically conductive physical connector; an electrical connector; a transformer; and an RF communication and data storage circuit. The electrical connector is electrically connected to the physical connector by a first conductive path. The transformer is electrically connected to the RF communication and data storage circuit. The transformer and the RF communication and data storage circuit are electrically isolated from the physical connector and the electrical connector. Electrically connecting the physical connector to the electrical connector by other than the first conductive path inductively couples the RF communication and data storage circuit to the first conductive path.

DETAILED DESCRIPTION

A plug-and-play process transmitter, as described in U.S. Patent Application Publication 2010/0302008, "SENSOR/TRANSMITTER PLUG-AND-PLAY FOR PROCESS INTSTRUMENTATION" incorporated herein by reference, provides for automatic loading of the configuration data for a sensor assembly into a process transmitter without the use of additional wiring, bringing true plug-and-play functionality to the field of process instrumentation. The present invention provides for reading and writing characteristic information for a sensor peripheral component without the use of additional wiring, extending the plug-and-play functionality to the sensor peripheral component. Physically connecting a plug-and-play sensor assembly to the sensor peripheral component permits a plug-and-play process transmitter connected to the sensor assembly to access a memory location on an RF communication and data storage circuit, for example, an RFID chip, within the sensor peripheral component employing only sensor wires carrying an analog sensor signal.

A modulated carrier signal from the process transmitter is inductively coupled to the RF communication and data storage circuit within the sensor peripheral component through conductive portions of the sensor peripheral component and the attached sensor assembly. By employing conductive portions of the sensor peripheral component and attached sensor assembly, an inductively coupled signal path is established in plug-and-play fashion merely by physically connecting the sensor assembly to the sensor peripheral component. The characteristic information stored in the memory location on the RF communication and data storage circuit within the sensor peripheral component is thus easily accessible by the process transmitter in a plug-and-play fashion, providing improved process measurement accuracy and reliability to the extent they depend on the availability of the characteristic information for an attached sensor peripheral component.

Figure 1:
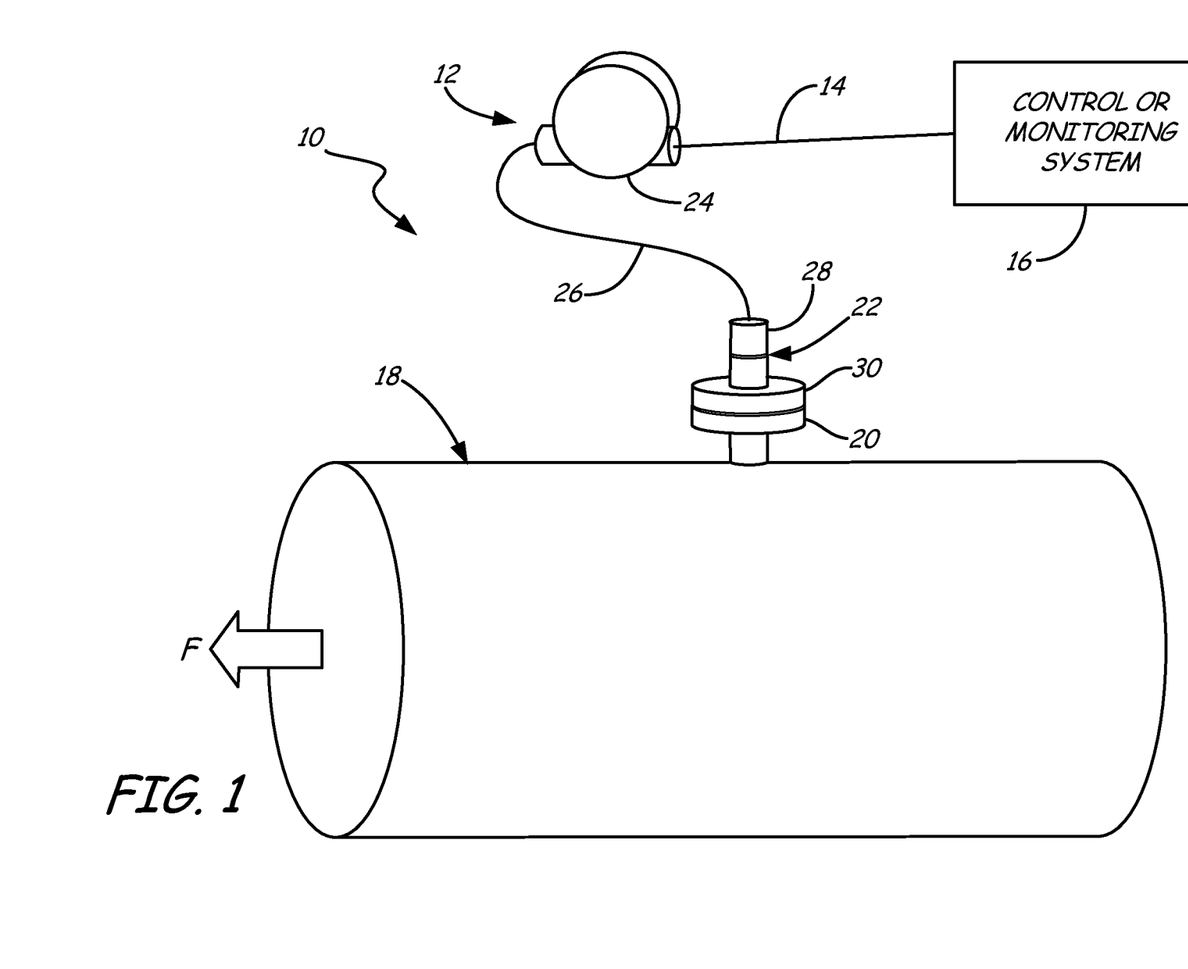
FIG. 1 shows a process measurement or control system embodying the present invention.

FIG. 1 illustrates a process measurement or control system embodying the present invention. FIG. 1 shows process monitoring or control system 10 includes process measurement system 12, transmission line 14, and control or monitoring system 16. Process monitoring or control system 10 monitors or controls process flow F in process piping 18. Process piping 18 includes flange connection 20. Flange connection 20 facilitates the connection of a flange-mounted instrument to measure at least one characteristic of process flow F, for example, temperature, flow rate, pressure, or pH. Process measurement system 12 includes sensor assembly and peripheral component system 22, process transmitter 24, and sensor wires 26. Sensor assembly and peripheral component system 22 includes sensor assembly 28 and sensor peripheral component 30. Sensor peripheral component 30 has a flange mount connection. Transmission line 14 can be a multi-wire cable, fiber optic cable, or a wireless connection. Process piping 18 may also be any of a number of process vessels including a process tank, storage tank, distillation column, or reactor.

Sensor peripheral component 30 of sensor assembly and peripheral component system 22 connects to flange connection 20 such that sensor assembly and peripheral component system 22 is proximate process flow F. Sensor wires 26 electrically connect process transmitter 24 to sensor assembly and peripheral component system 22 at sensor assembly 28. Transmission line 14 connects process transmitter 24 to control or monitoring system 16. Process transmitter 24 and sensor assembly 28 are plug-and-play devices. Connecting process transmitter 24 to sensor assembly and peripheral component system 22 permits process transmitter 24 to read information from, and store information in, a memory location within sensor assembly 28, including, for example, configuration data associated with sensor assembly 28. In the present invention, sensor peripheral component 30 is also a plug-and-play device. Connecting process transmitter 24 to sensor assembly and peripheral component system 22 also permits process transmitter 24 to read information from, and store information in, a memory location within sensor peripheral component 30, for example, characteristic information specific to sensor peripheral component 30. The plug-and-play functionality between process transmitter 24 and sensor assembly and peripheral component system 22 requires only sensor wires 26.

In operation, sensor assembly and peripheral component system 22 senses at least one characteristic of process flow F with sensor assembly 28 sensing the flow characteristic and sensor peripheral component 30 protecting, or enhancing the performance of, sensor assembly 28. Sensor assembly and peripheral component system 22 communicates an analog sensor signal representing the flow characteristic sensed to process transmitter 24 over sensor wires 26. Process transmitter 24 digitizes and adjusts the analog sensor signal based on configuration data provided by sensor assembly 28 and stored within process transmitter 24 to produce a measurement of the flow characteristic of process flow F. Process transmitter 24 transmits the measurement over transmission line 14 to control or monitoring system 16. Control or monitoring system 16 may use the measurement for a variety of purposes, including making a record of the measurement, providing control instructions to control elements based on the information, or reporting the measurement to another monitoring or control system. Process transmitter 24 may also transmit the characteristic information provided by sensor peripheral component 30 to control or monitoring system 16. In addition, process transmitter 24 may provide the characteristic information to a hand held device (not shown) temporarily connected to process transmitter 24 for maintenance of process measurement system 12 or show the characteristic information on a display (not shown) of process transmitter 24.

The embodiment of FIG. 1 employs a flange connection between sensor assembly and peripheral component system 22 and process piping 18. It is understood, however, that the present invention applies to any type of connection between a sensor assembly and peripheral component system and a process vessel, including, for example, a welded connection or a threaded connection.

Figure 2:
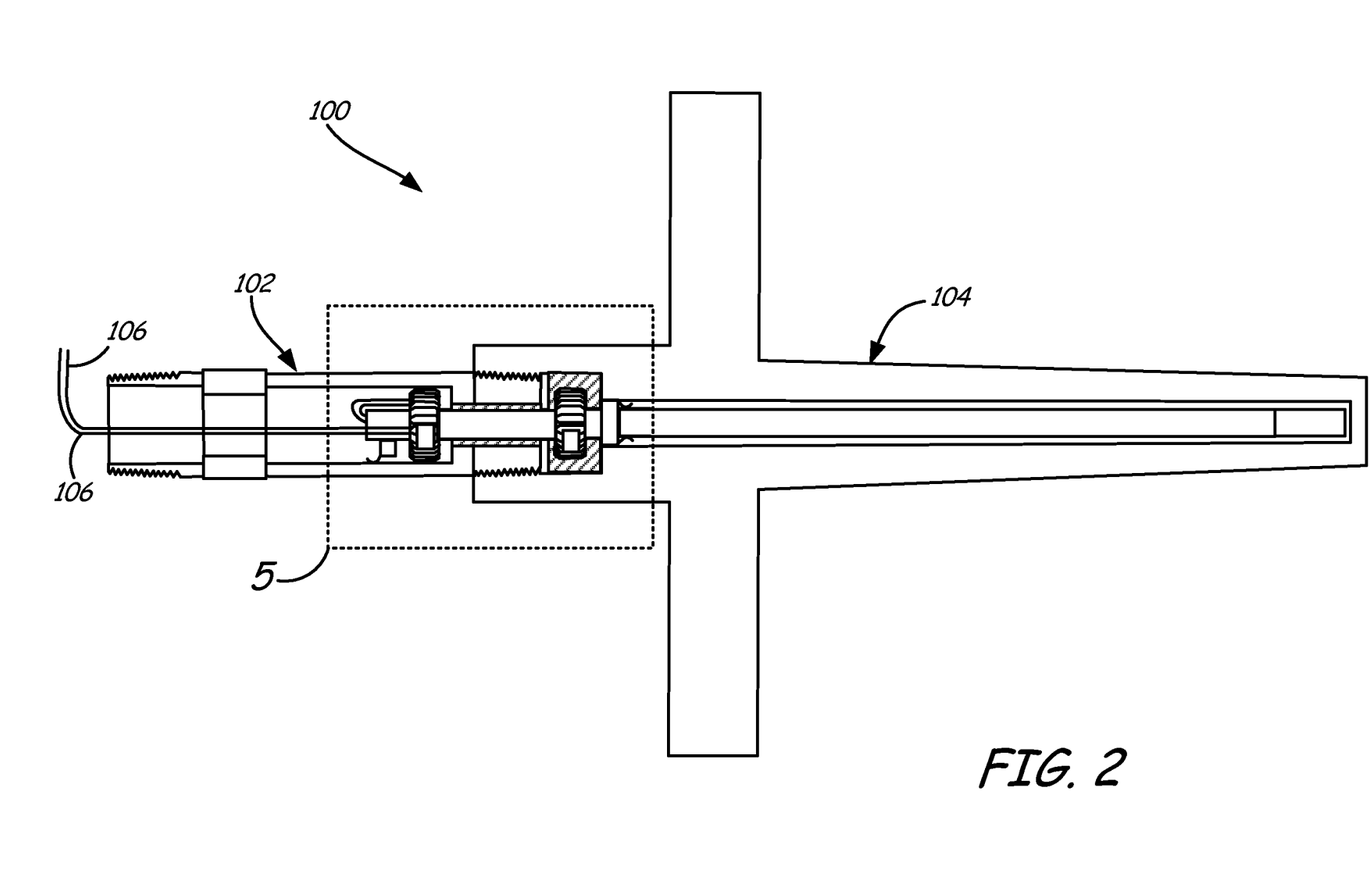
FIG. 2 is a diagram of plug-and-play sensor assembly and peripheral component system embodying the present invention.

FIG. 2 is a diagram of a plug-and-play sensor assembly and peripheral component system illustrating one embodiment of the present invention. In the embodiment of FIG. 2, the characteristic of process flow F to be measured is temperature and the sensor assembly and peripheral component system senses temperature. As illustrated in FIG. 2, sensor assembly and peripheral component system 100 includes a sensor assembly, temperature sensor assembly 102; and a sensor peripheral component, thermowell 104. A portion of sensor wires 106 is also included in sensor assembly and peripheral component system 100 to connect it with a plug-and-play process transmitter, such as process transmitter 24 described in reference to FIG. 1 or process transmitter 204 described below in reference to FIG. 6. Sensor wires 106 are as described for sensor wires 26 in reference to FIG. 1.

Figure 3:
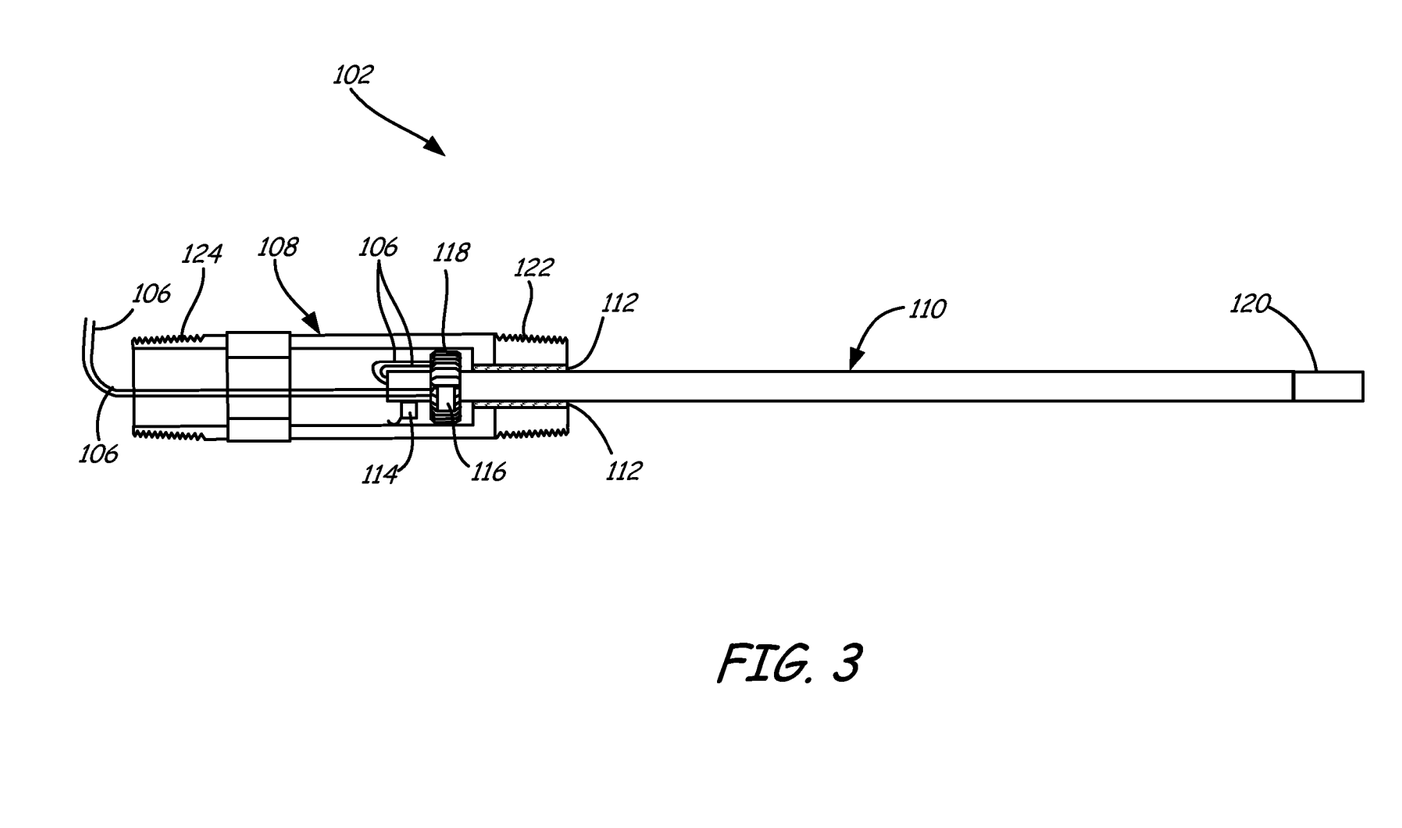
FIG. 3 is a diagram of the plug-and-play sensor assembly of the plug-and-play sensor assembly and peripheral component system of FIG. 2.
Figure 4:
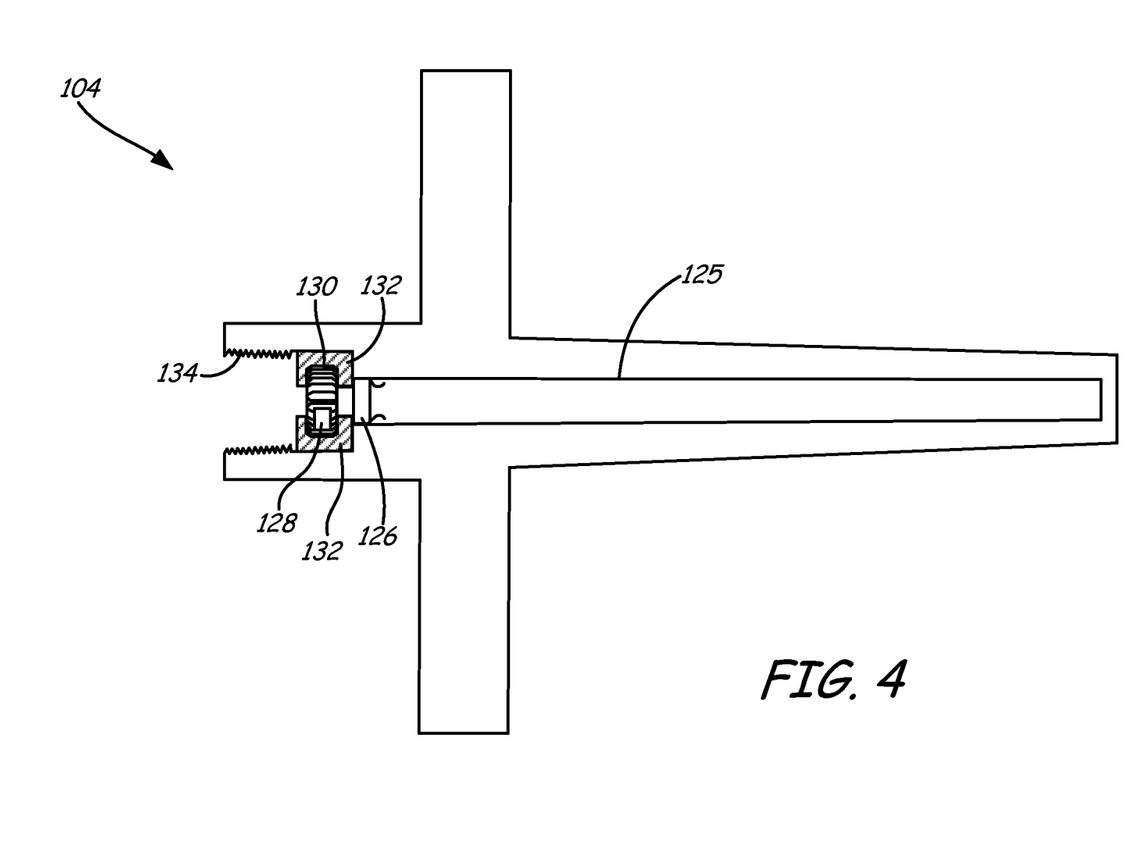
FIG. 4 is a diagram of the plug-and-play sensor peripheral component of the plug-and-play sensor assembly and peripheral component system of FIG. 2.

FIGS. 3 and 4 illustrate in greater detail the components of sensor assembly and peripheral component system 100 according to this embodiment. FIG. 3 is a diagram of plug-and-play temperature sensor assembly 102. Temperature sensor assembly 102 includes sensor adaptor 108, sensor capsule 110, electrical insulator 112, sensor assembly electrical connector 114, sensor RF communication and data storage circuit 116, and sensor assembly transformer 118. Sensor capsule 110 is a temperature sensor capsule including a temperature sensor, sensor 120. The outer surface of sensor capsule 110 is electrically conductive. As illustrated, sensor adaptor 108 includes sensor assembly connection threads 122 and transmitter connection threads 124. As mentioned above, temperature sensor assembly 102 also includes a portion of sensor wires 106. Sensor assembly transformer 118 is preferably a toroidal core transformer, as illustrated in this embodiment. Alternatively, transformers of other shapes may be employed.

Sensor capsule 110 extends from a first end within sensor adaptor 108 to a second end not within sensor adaptor 108. The second end contains within it sensor 120. Electrical insulator 112 is between sensor capsule 110 and sensor adaptor 108 in the region where sensor capsule 110 exits sensor adaptor 108. This arrangement serves to physically connect sensor capsule 110 to sensor adaptor 108 while electrically isolating sensor capsule 110 from sensor adaptor 108 in the region where sensor capsule 110 exits sensor adaptor 108. Sensor wires 106 are electrically connected to sensor 120 and extend from sensor 120 through the length of sensor capsule 110, out through the first end of sensor capsule 110 within sensor adaptor 108, and form a first coil of sensor assembly transformer 118 before exiting sensor adaptor 108 to connect with the plug-and-play process transmitter (not shown). Sensor wires 106 are insulated such that there is no direct electrical contact between sensor wires 106 and the electrically conductive surface of sensor capsule 110. Within sensor adaptor 108, sensor assembly transformer 118 is positioned such that sensor capsule 110 passes through sensor assembly transformer 118 along an axis of sensor assembly transformer 118. Sensor RF communication and data storage circuit 116 is electrically connected to a second coil of sensor assembly transformer 118. Sensor assembly electrical connector 114 electrically connects sensor capsule 110 to sensor adaptor 108 in the region between the first end of sensor capsule 110 and sensor assembly transformer 118. As illustrated, sensor assembly electrical connector 114 is physically attached to sensor capsule 110 and contacts sensor adaptor 108 via a curved spring contact. Sensor assembly electrical connector 114 may have a single curved spring contact as shown or multiple curved spring contacts.

FIG. 4 is a diagram of plug-and-play thermowell 104. As with all thermowells, thermowell 104 has internal cavity 125 running nearly the full length along its axis to accommodate a sensor capsule. Thermowell 104 includes thermowell electrical connector 126, thermowell RF communication and data storage circuit 128, thermowell transformer 130, potting 132, and thermowell connection threads 134. As illustrated, thermowell electrical connector 126 is physically attached to thermowell 104 with multiple curved spring contacts extending toward the center of internal cavity 125. Thermowell transformer 130 is positioned such that it is coaxial with internal cavity 125. Preferably, thermowell transformer 130 is held in position by potting 132 as illustrated in FIG. 4. Alternatively, a clip or other support structure may be employed to fix the position of thermowell transformer 130. Thermowell RF communication and data storage circuit 128 is electrically connected to a first coil of thermowell transformer 130. As with sensor assembly transformer 118, thermowell transformer 130 is preferably a toroidal core transformer, as illustrated in this embodiment. Alternatively, transformers of other shapes may be employed.

Sensor and thermowell RF communication and data storage circuits 116, 128 are integrated circuits including data storage and RF communication functions, preferably radio frequency identification (RFID) chips. An RFID chip and an RFID antenna in a single unit form an RFID tag. In the present invention, only the RFID chips are preferably employed because coils in sensor assembly transformer 118 and thermowell transformers 130 each act as an antenna for its connected RFID chip. In such an embodiment, the attached plug-and-play process transmitter would include an RFID reader integrated circuit as described below in reference to FIG. 6. RFID chips are a low cost option and readily available. Alternatively, specific performance requirements may dictate the use of a custom integrated circuit including RF communication and memory functionality as described in U.S. Patent Application Publication 2010/0302008, "SENSOR/TRANSMITTER PLUG-AND-PLAY FOR PROCESS INTSTRUMENTATION."

Sensor assembly transformer 118 and thermowell transformer 130 preferably include powdered iron or ferrite cores for low frequency applications. Alternatively, air core transformers may be used, especially for high frequency applications.

Considering FIGS. 2-4 together, temperature sensor assembly 102 attaches to thermowell 104 by engagement of sensor assembly connection threads 122 with thermowell connection threads 134 creating a physical and electrical connection between them to form sensor assembly and peripheral component system 100. As show in FIG. 2, attaching temperature sensor assembly 102 to thermowell 104 causes sensor capsule 110 to pass through thermowell transformer 130 along the axis of thermowell transformer 130, and into internal cavity 125. In passing into internal cavity 125, the electrically conductive outer surface of sensor capsule 110 engages the multiple curved spring contacts of thermowell electrical connector 126 forming an electrical connection between thermowell 104 and sensor capsule 110 in a region between the second end of sensor capsule 110 and thermowell transformer 130.

Figure 5:
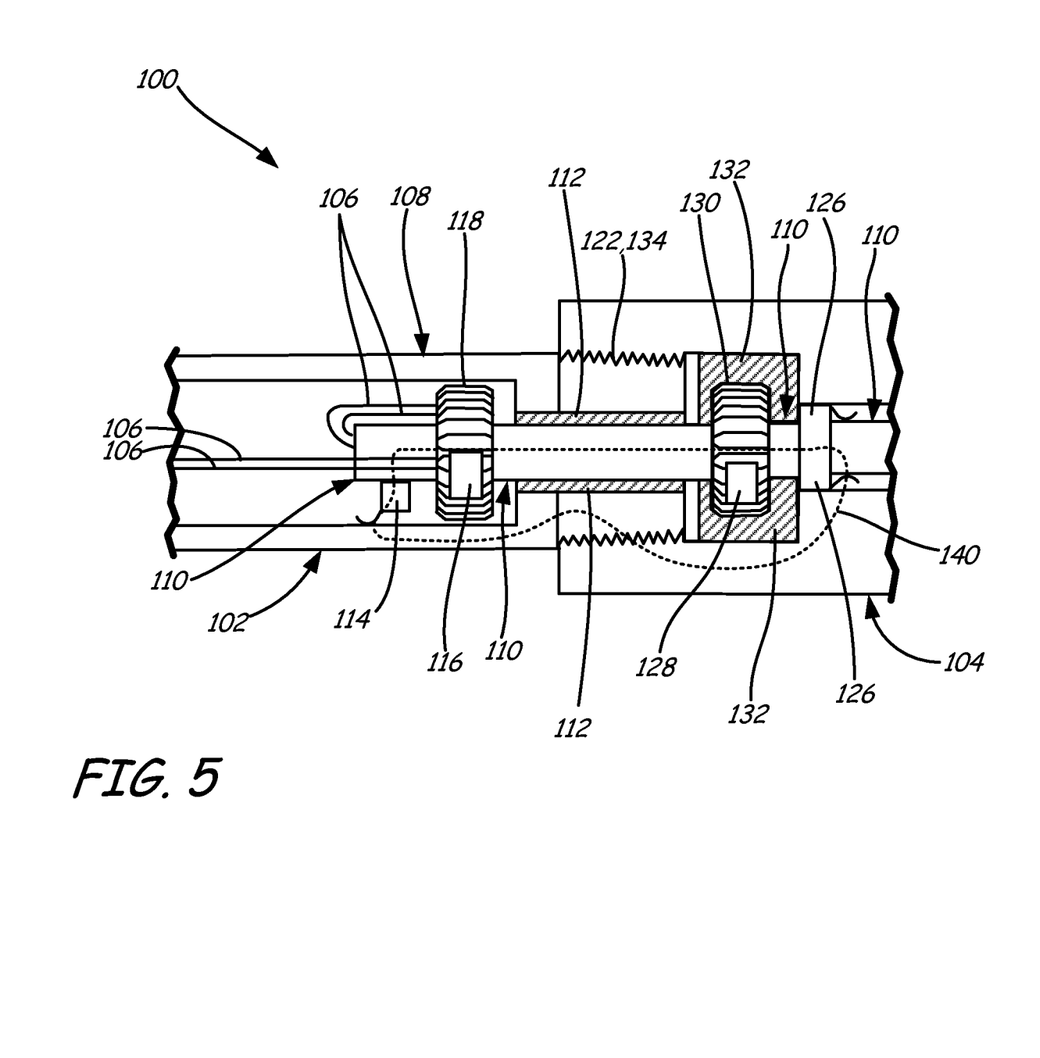
FIG. 5 is a diagram illustrating a portion of plug-and-play sensor assembly and peripheral component system of FIG. 2 in greater detail.

FIG. 5 is a diagram illustrating a portion of plug-and-play sensor assembly and peripheral component system of FIG. 2 in greater detail. As illustrated by a dotted line in FIG. 5, the attachment of temperature sensor assembly 102 to thermowell 104 creates single turn transformer coupling 140 between sensor assembly transformer 118 and thermowell transformer 130. The path of single turn transformer coupling 140 includes the electrically conductive surface of sensor capsule 110 from sensor assembly electrical connector 114, through sensor assembly transformer 118, through thermowell transformer 130 to thermowell electrical connector 126. The coupling path continues through thermowell electrical connector 126 to thermowell 104, across the electrical connection formed by the engagement of sensor assembly connection threads 122 with thermowell connection threads 134, to sensor adaptor 108. The coupling path is completed from sensor adaptor 108 to sensor capsule 110 by sensor assembly electrical connector 114. Electrical insulator 112 prevents short circuiting of single turn transform coupling 140 in the region between sensor assembly transformer 118 and thermowell transformer 130. Thus, merely attaching temperature sensor assembly 102 to thermowell 104 in the usual fashion for attaching a temperature sensor assembly to a thermowell creates single turn transformer coupling 140 and enables plug-and-play functionality for thermowell 104.

Figure 6:
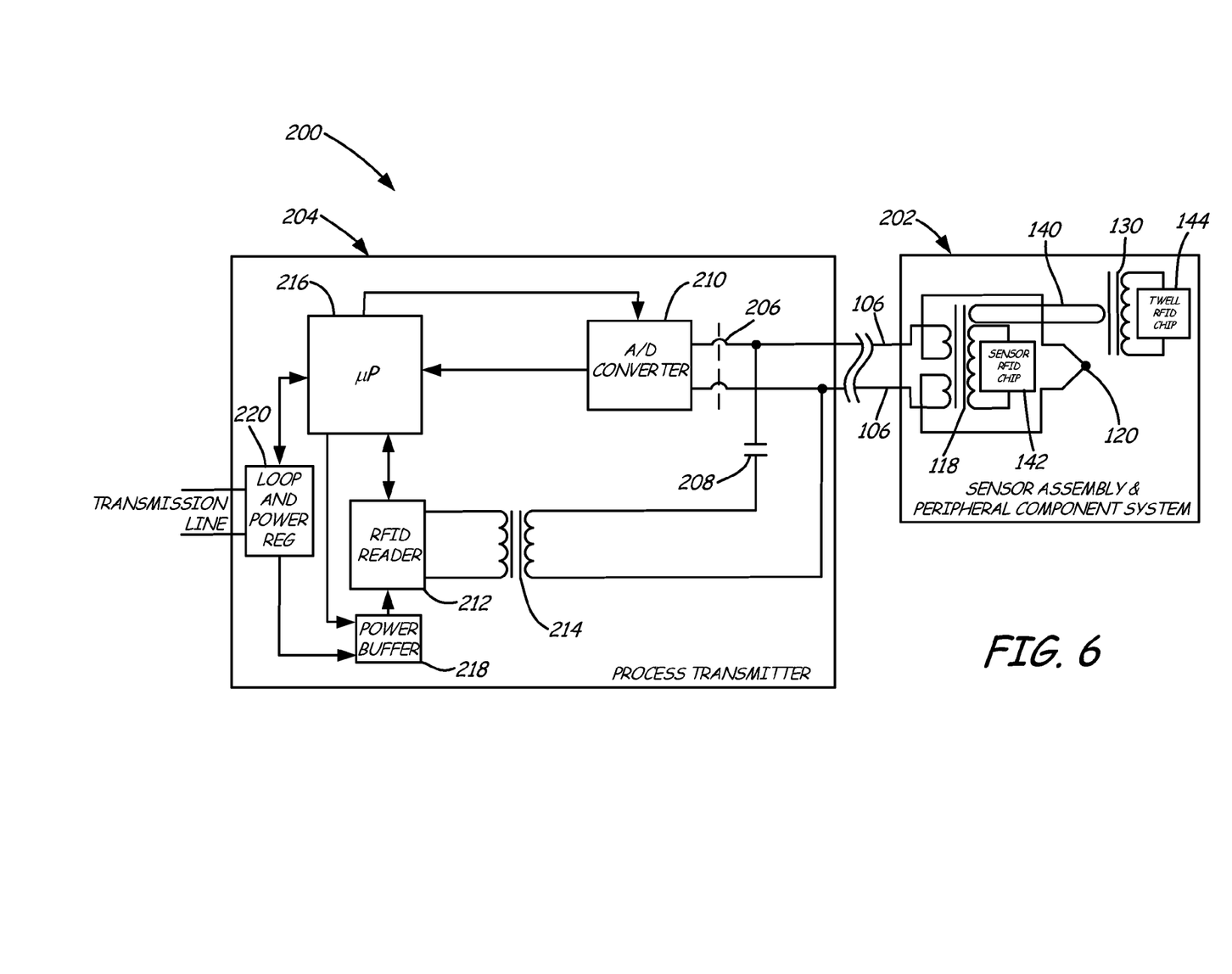
FIG. 6 is a schematic diagram illustrating a plug-and-play process measurement system embodying the present invention.

FIG. 6 is a schematic diagram illustrating an embodiment of a plug-and-play process measurement system incorporating the present invention. In this embodiment, transformers are used to inductively couple a modulated carrier signal between an RFID reader in a plug-and-play process transmitter and RFID chips in a plug-and-play sensor assembly and peripheral component system, including an RFID chip in a temperature sensor assembly and an RFID chip in a thermowell. This arrangement provides for reading digital information from, and storing digital information in, a memory location on the RFID chip within the temperature sensor assembly and a memory location on the RFID chip within the thermowell. Importantly, access to these memory locations is achieved while maintaining an accurate analog temperature sensor signal, all without the use of wires between the process transmitter and the sensor assembly and peripheral component system other than those carrying the sensor signal.

FIG. 6 shows process measurement system 200 including plug-and-play sensor assembly and peripheral component system 202 and plug-and-play process transmitter 204. Sensor assembly and peripheral component system 202 is identical to sensor assembly and peripheral component system 100 as described above in reference to FIGS. 2-5, except sensor RF communication and data storage circuit 116 and thermowell RF communication and data storage circuit 128 are explicitly RFID chips: sensor RFID chip 142 and thermowell RFID chip 144, respectively. Process transmitter 204 includes sensor filter 206, blocking capacitor 208, A/D converter 210, RFID reader IC 212, communication transformer 214, microprocessor 216, power buffer 218, and loop and power regulator 220. Communication transformer 214 preferably includes a powdered iron or ferrite core for low frequency applications. Alternatively, an air core transformer may be used, especially for high frequency applications. Loop and power regulator 220 regulates power to process transmitter 204, from a transmission line, such as transmission line 14 described above in reference to FIG. 1. Loop and power regulator 220 also controls communication between process transmitter 204 and the transmission line.

As shown in FIG. 6, sensor assembly and peripheral component system 202 is connected to process transmitter 204 by sensor wires 106. Within temperature process transmitter 204, sensor wires 106 are split into two pairs, such that one pair of sensor wires 106 is connected to sensor filter 206 and the other pair of sensor wires 106 forms a first coil of communication transformer 214. Blocking capacitor 208 is connected into one of sensor wires 106 forming the first coil of communication transformer 214 at a point between the split of sensor wires 106 into two pairs and communication transformer 214. RFID reader IC 212 is electrically connected to a second coil of communication transformer 214. RFID reader IC 212 is connected to microprocessor 216, and power buffer 218. Microprocessor 216 is connected to A/D converter 210, power buffer 218, and power regulator 220. Sensor filter 206 is connected to A/D converter 210. Loop and power regulator 220 is connected to a transmission line, for example, transmission line 14 as described above in reference to FIG. 1.

When process transmitter 204 is powered up, manually signaled, or sensor assembly and peripheral component system 202 connects to process transmitter 204 by sensor wires 106 following a period of disconnection, microprocessor 216 signals RFID reader IC 212 to request configuration data from temperature sensor assembly 102 or characteristic information from thermowell 104. RFID reader IC 212 generates a carrier signal, modulated to encode the request, and conducts the modulated carrier signal to communication transformer 214. The modulated carrier signal is produced in sensor wires 106 by inductive coupling through communication transformer 214. The modulated carrier signal propagates from process transmitter 204 to sensor assembly and peripheral component system 202 along sensor wires 106. Upon reaching sensor assembly and peripheral component system 202, the modulated carrier signal inductively couples across sensor assembly transformer 118 from sensor wires 106 to both sensor RFID chip 142 and single turn transformer coupling 140. The modulated carrier signal further propagates through single turn transformer coupling 140 and inductive couples across thermowell transformer 130 to thermowell RFID chip 144.

In addition to containing an encoded request for configuration data or characteristic information, the modulated carrier signal also provides power to both sensor RFID chip 142 and thermowell RFID chip 144. Should the encoded request be directed toward sensor RFID chip 142 (e.g. configuration data request for sensor assembly 102), sensor RFID chip 142 will process the encoded request, remodulate the carrier signal to encode the requested configuration data and transmit the remodulated carrier signal back through sensor assembly transformer 118, sensor wires 106, and communication transformer 214 to RFID reader IC 212. RFID reader IC 212 demodulates the remodulated carrier signal and sends the configuration data to microprocessor 216, which stores the configuration data in local memory. Similarly, should the encoded request be directed toward thermowell RFID chip 144 (e.g. characteristic information request for thermowell 104), thermowell RFID chip 144 will process the encoded request, remodulate the carrier signal to encode the requested information and transmit the remodulated carrier signal back through thermowell transformer 130, single turn transformer coupling 140, sensor assembly transformer 118, sensor wires 106, and communication transformer 214 to RFID reader IC 212. RFID reader IC 212 demodulates the remodulated carrier signal and sends the characteristic information to microprocessor 216, which stores the information in local memory.

Once process transmitter 204 has the configuration data for temperature sensor assembly 102, sensor element 120 senses temperature, creating an analog sensor signal. As illustrated in FIG. 6, sensor element 120 is a thermocouple type, thus the analog sensor signal is a change in voltage level across sensor element 120. The analog sensor signal conducts from temperature sensor assembly 102 to process transmitter 204 via sensor wires 105, unchanged by the passage of sensor wires 106 through sensor assembly transformer 118. At process transmitter 204, the analog sensor signal passes through sensor filter 206, which filters out high frequency interference, including any modulated carrier signals propagating on sensor wires 106, and on to A/D converter 210. In addition, blocking capacitor 208 prevents communication transformer 214 from shorting the analog sensor signal. A/D converter 210 converts the analog sensor signal to a digital sensor signal and sends it to microprocessor 216. Microprocessor 216 retrieves the configuration data from the local memory and adjusts the digital sensor signal, using the configuration data, to reflect an accurate temperature measurement. Microprocessor 216 also retrieves the characterization information from the local memory. The temperature measurement and the characterization information is forwarded to loop and power regulator 220 for transmission over, for example, transmission line 14 as described above in reference to FIG. 1. In addition, process transmitter 204 may provide the temperature measurement or characteristic information to a hand held device (not shown) temporarily connected to process transmitter 204 for maintenance of process measurement system 200 or show the temperature measurement or characteristic information on a display (not shown) of process transmitter 204, if so equipped. The embodiment shown in FIG. 6 can also store and retrieve other types of digital information, beyond retrieving configuration data or characteristic information, because the digital communication is two-way.

In some applications, including low power current loop applications or wireless transmitter applications, RFID reader IC 212 may require more power than is available on a continuous basis. Power buffer 218 monitors available transmitter power and accumulates power exceeding that required for other operations of process transmitter 204. Once sufficient power has been accumulated, power buffer 218 communicates this status to microprocessor 216. RFID reader IC 212 uses the accumulated power from power buffer 218 once microprocessor 216 initiates digital communication with sensor assembly and peripheral component system 202.

While FIG. 6 illustrates the invention where sensor element 120 is a thermocouple type sensor element, 2-, 3-, and 4-wire RTDs may also be used. For example, a 2-wire RTD may be employed provided high frequency bypass capacitor runs in parallel with 2-wire RTD sensor element. 3-wire RTD and 4-wire RTD elements simply require an additional one or two sensor wires separate from sensor wires 106 because they do not need to inductively couple with either sensor assembly transformer 118 or communication transformer 214.

Although all embodiments discussed above include a single temperature sensor assembly connected to a temperature process transmitter, it is understood that the invention may include multiple temperature sensor assemblies connected to a single temperature process transmitter through multiplexing. In addition, for purposes of brevity and ease of illustration, all embodiments discussed above use temperature as the process variable to be measured. However, it is understood that the invention is applicable to the measurement of other process variables, including pressure, pH, and flow rate.

The present invention provides for reading and writing characteristic information for a sensor peripheral component and stored within the sensor peripheral component without the use of additional wiring, extending plug-and-play functionality to the sensor peripheral component. Physically connecting a plug-and-play sensor assembly to such a plug-and-play sensor peripheral component permits a plug-and-play process transmitter connected to the sensor assembly to access a memory location on an RF communication and data storage circuit, for example, an RFID chip, within the sensor peripheral component employing only sensor wires carrying an analog sensor signal.

The present invention inductively couples a modulated carrier signal from the process transmitter to the RF communication and data storage circuit within the sensor peripheral component through conductive portions of the sensor peripheral component and the attached sensor assembly. By employing conductive portions of the sensor peripheral component and attached sensor assembly, an inductively coupled signal path is established in plug-and-play fashion merely by physically connecting the sensor assembly to the sensor peripheral component. The characteristic information stored in the memory location on the RF communication and data storage circuit within the sensor peripheral component is thus easily accessible by the process transmitter in a plug-and-play fashion, providing improved process measurement accuracy and reliability to the extent they depend on the availability of the characteristic information for the attached sensor peripheral component. No longer must characteristic information for a sensor peripheral component be manually entered into the process transmitter. In addition, maintenance schedules reflecting actual usage are readily available, and metal identification tags are no longer essential.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a sensor assembly comprising:
      a sensor adaptor;
      a first transformer within the sensor adaptor, the first transformer configured to inductively couple to sensor wires; and
      an electrically conductive sensor assembly component that extends from a first end within the sensor adaptor to a second end not within the sensor adaptor, wherein the electrically conductive sensor assembly component is configured such that the first transformer inductively couples the electrically conductive sensor assembly component to the sensor wires; and
   a sensor peripheral component comprising:
      an RF communication and data storage circuit; and
      a second transformer electrically connected to the RF communication and data storage circuit;
   wherein physical attachment of the sensor assembly to the sensor peripheral component causes the second transformer to inductively couple the electrically conductive sensor assembly component to the RF communication and data storage circuit to form a transformer coupling between the first and second transformers such that the RF communication and data storage circuit is inductively coupled to the sensor wires to communicate information between the RF communication and data storage circuit and the sensor wires; wherein the electrically conductive sensor assembly component comprises a temperature sensor and the sensor peripheral component comprises a thermowell.

2. The system of claim 1, wherein the first transformer is a first toroidal core transformer and the second transformer is a second toroidal core transformer.

3. The system of claim 2, wherein the electrically conductive sensor assembly component passes through the first toroidal transformer along an axis of the first toroidal transformer to configure the electrically conductive sensor assembly component such that the first toroidal core transformer inductively couples the electrically conductive sensor assembly component to the sensor wires.

4. The system of claim 2, wherein the physical attachment of the sensor assembly to the sensor peripheral component causes the electrically conductive sensor assembly component to pass through the second toroidal core transformer along an axis of the second toroidal core transformer to form the transformer coupling between the first and second toroidal core transformers.

5. The system of claim 1, further comprising a process transmitter electrically connected to the sensor wires, the process transmitter comprising an RF communication circuit for communicating information between the process transmitter and the RF communication and data storage circuit.

6. The system of claim 5, wherein the information communicated between the RF communication and data storage circuit and the process transmitter comprises characteristic information for the sensor peripheral component.

7. The system of claim 6, wherein the characteristic information comprises at least one of sensor peripheral component type, unique sensor peripheral component identification information, fouling diagnostics information, and maintenance schedule information.

8. The system of claim 5, wherein the information is communicated between the RF communication and data storage circuit and the process transmitter as a digital communication.

9. The system of claim 8, wherein the digital communication is provided by a modulated carrier signal.

10. The system of claim 9, wherein the RF communication and data storage circuit is an RFID chip.

11. The system of claim 1, further comprising:
    an electrical insulator axially surrounding a portion of the electrically conductive sensor assembly component between the first transformer and the second transformer for electrically insulating the portion of the electrically conductive sensor assembly component from the sensor adaptor and the sensor peripheral component.

12. The system of claim 11, wherein the electrical insulator includes at least one of a glass, fiberglass, polyimide, and an air gap.

13. The system of claim 1, further comprising:
    a first electrical connector within the sensor adaptor configured to connect the electrically conductive sensor assembly component to the sensor adaptor at a point between the first end of the electrically conductive sensor assembly component and the first transformer; and a second electrical connector within the sensor peripheral component configured to connect the sensor peripheral component to the electrically conductive sensor assembly component at a point between the second end of the electrically conductive sensor assembly component and the second transformer.

14. A method of accessing characteristic information from a plug-and-play sensor peripheral component comprises:

attaching a plug-and-play sensor assembly to the plug-and-play sensor peripheral component, wherein the sensor assembly comprises a temperature sensor and the sensor peripheral component comprises a thermowell;

supplying a carrier signal over sensor wires to the plug-and-play sensor assembly;

inducing the carrier signal into a transformer coupling;

inducing the carrier signal from the transformer coupling into the plug-and-play sensor peripheral component;

modulating the carrier signal based upon characteristic information of the plug-and-play sensor peripheral component stored in the plug-and-play sensor peripheral component to produce a first modulated carrier signal containing the characteristic information;

inducing the first modulated carrier signal into the transformer coupling;

inducing the first modulated carrier signal from the transformer coupling into the plug-and-play sensor assembly;

supplying the first modulated carrier signal from the plug-and-play sensor assembly to the sensor wires; and demodulating the first modulated carrier signal supplied by the plug-and-play sensor assembly to obtain the characteristic information.

15. The method of claim 14 wherein attaching the plug-and-play sensor assembly to the plug-and-play sensor peripheral component is the same as attaching a non-plug-and-play sensor assembly to a non-plug-and-play sensor peripheral component.

16. The method of claim 14 and further comprising:

modulating the carrier signal supplied over sensor wires to the plug-and-play sensor assembly to produce a second modulated carrier signal containing characteristic information to be stored in the plug-and-play sensor peripheral component;

supplying the second modulated carrier signal from the process transmitter to the plug-and-play sensor assembly;

inducing the second modulated carrier signal into the transformer coupling;

inducing the second modulated carrier signal from the transformer coupling into the plug-and-play sensor peripheral component; and demodulating the second modulated carrier signal containing the characteristic information to be stored in the plug-and-play sensor peripheral component.

* * * * *